Patented Oct. 1, 1929

1,730,186

UNITED STATES PATENT OFFICE

FRITZ BAUMANN, OF LEVERKUSEN-ON-THE-RHINE, GERMANY, ASSIGNOR TO GENERAL ANILINE WORKS, INC., OF NEW YORK, N. Y., A CORPORATION OF DELAWARE

NEW COTTON DYESTUFF OF THE ANTHRAQUINONE SERIES

No Drawing. Application filed July 7, 1927, Serial No. 204,149, and in Germany July 13, 1926.

The present invention relates to new vat dyestuffs of the anthraquinone series, more particularly to dyestuffs of the general formula:

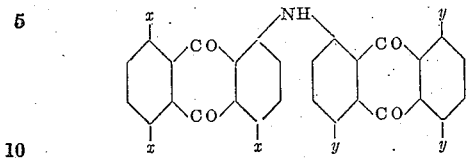

wherein one $x$ and one $y$ stand for benzoylamino-groups, at least one $x$ or $y$ for an alkoxy-group and the remaining $x$'s and $y$'s for hydrogen. They are obtainable for instance, by condensing an aminoanthraquinone compound of the general formula:

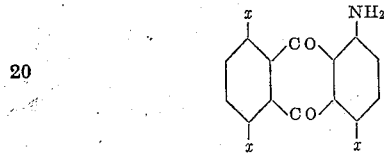

wherein one $x$ stands for a benzoylamino-group, one $x$ for an alkoxy group and one $x$ for hydrogen with a chloroanthraquinone compound of the general formula:

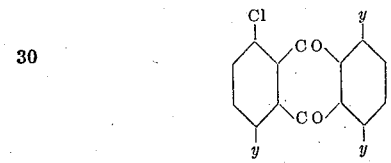

wherein one $y$ stands for a benzoylamino-group, the other $y$'s for hydrogen or alkoxy-groups.

I prefer to carry out this process in the presence of a high boiling solvent such as naphthalene or nitrobenzene with the addition of sodium-acetate as acid binding agent and a small amount of copper powder or of a copper compound.

The compounds are well crystallized and rather difficultly soluble in organic solvents, so that they generally separate already during the process of preparing them. When working in the presence of naphthalene as solvent, it is advantageous to dilute the melt with pyridine or toluene before filtering it.

By treating my new compounds with concentrated sulfuric acid of about 90% strength, a conversion occurs which is easily perceptible by the changement of the color. Probably hydrocompounds are formed which by treatment with oxidizing agents such as manganese dioxide, sodium nitrite or chromic acid, are converted either directly or after dilution with water, into valuable vat dyestuffs which dye cotton orange to red to red-brown shades of excellent clearness and very good fastness to light and to washing. They correspond probably to the general formula:

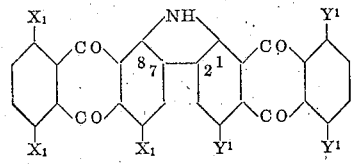

wherein one $X_1$ and one $Y^1$ stand for benzoylamine groups, at least one $X_1$ or $Y^1$ for an alkoxy group and the remaining $X_1$'s and $Y^1$'s for hydrogen.

The following examples serve to illustrate my invention, all parts being by weight:

*Example 1.*—10 parts of 1-benzoylamino-4-hydroxy-5-chloroanthraquinone are heated to boiling in 150 parts naphthalene together with ten parts of 1-benzoylamin-4-amino-anthraquinone, 10 parts anhydrous sodium acetate and 0,1 part copper for about 4 hours. The reaction mass is diluted with 300 parts toluene and the difficultly soluble dye base is filtered off at a temperature of 110° C. The dyestuff thus obtained has the formula:

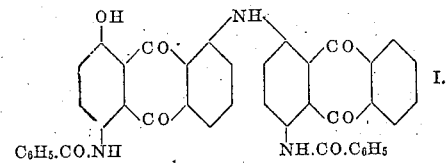

I.

It dissolves in concentrated sulfuric acid with olive-green color which changes soon to a red-brown. When pouring the sulfuric acid solution into water containing chromic acid, a compound separates in bordeaux-red flakes which is different from the compound of Formula I. It dyes cotton strong bordeaux-red shades which, however, are not fast against alkalies since the compound contains a free hydroxyl-group.

In the order to convert the hydroxyl-group into the methoxy-group, I prefer to use the following process:

5 parts of the above described compound, 5 parts of toluene sulfonic acid methyl ester and 5 parts of sodium carbonate are heated to boiling in 50 parts of nitrobenzene until the free hydroxyl-group can no more be proved. After cooling, the methoxy-compound separates in well crystallized dark-brown needles of metallic lustre which are soluble in hot nitrobenzene with bordeaux-red color. In concentrated sulfuric acid of about 90% strength it dissolves with at first green color which after a short time changes to copper-red.

When pouring the copper-red concentrated sulfuric acid solution into water containing sodium nitrate, a red-brown solution is obtained from which cotton is dyed clear red-brown shades of excellent fastness to light and to washing.

*Example 2.*—10 parts 1-benzoylamino-4-hydroxy-5-aminoanthraquinone which can be obtained for instance by saponifying one benzoylamino-group of the 1.5-dibenzoylamino-4-hydroxyanthraquinone are heated in naphthalene together with 10 parts 1-benzoylamino-4-chloroanthraquinone and 10 parts of sodium acetate and a small addition of copper.

The further treatment is carried out in the same manner as described in Example 1 and the same compounds are obtained as in Example 1.

*Example 3.*—1-benzoylamino-4-hydroxy-5-chloroanthraquinone is methylated with toluene sulfonic acid methyl ester in nitrobenzene solution in the presence of magnesium-oxide. The 1-benzoylamino-4-methoxy-5-chloroanthraquinone thus obtained crystallizes in large brick-red plates which are soluble in concentrated sulfuric acid with a dull orange color.

One part of this compound is heated in 12 parts of naphthalene, together with one part of 1-benzoylamino-5-aminoanthraquinone 1 part of anhydrous sodium acetate and a small amount of copper. The process is carried out as in Example 1.

The dyestuff thus obtained is soluble in concentrated sulfuric acid with olive-green color which changes to red-brown. When after-treated with an oxidizing agent it dyes cotton very strong clear yellow-brown shades. It has the formula:

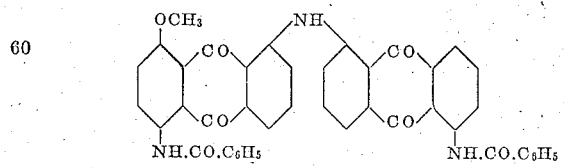

*Example 4.*—By careful nitration in a sulfuric acid solution of the 1-methoxy-8-chloroanthraquinone which is obtained for instance by treatment of 1.8-dichloroanthraquinone and 1.8-nitrochloroanthraquinone with a solution of potassiumhydroxide in methylalcohol, the 1-methoxy-4-nitro-8-chloroanthraquinone is obtained which is reduced and converted into the benzoylamino compound according to the usual methods. By treating the 1-benzoylamino-4-methoxy-5-chloroanthraquinone with toluenesulfamide and saponifying with sulfuric acid, the 1-benzoylamino-4-methoxy-5-aminoanthraquinone is obtained.

If the compound is condensed with 1-benzoylamino-4-methoxy-5-chloroanthraquinone according to Example 1, a dye base is obtained which is soluble in concentrated sulfuric acid of about 90% strength with a blue-gray color which changes very quickly to a red color with a blue hue. It has the formula:

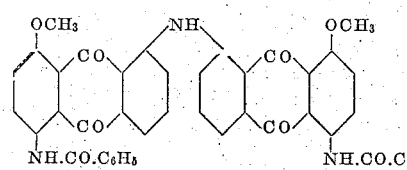

When after-treating with concentrated sulfuric acid and manganese-dioxide, a dyestuff is obtained which dyes cotton a clear red of excellent fastness to light and to washing.

I claim:

1. As new products the compounds having the general formula:

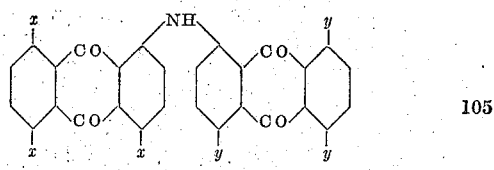

wherein one $x$ and one $y$ stand for benzoylamino-groups, at least one $x$ or one $y$ for an alkoxy-group and the remaining $x$'s and $y$'s for hydrogen, which products are well crystallizing compounds soluble in concentrated sulfuric acid with a generally dull olive-green to blue-grey color which changes soon into a red-brown to orange-red to red color.

2. As new products the compounds of the general formula:

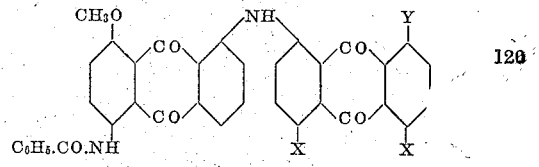

wherein one X represents a benzoylamino group, the other X hydrogen and Y stands for hydrogen or an alkoxy group, being well crystallizing compounds soluble in concentrated sulfuric acid with a generally dull olive-green to blue-grey color which changes soon into a red-brown to orange-red to red color.

3. As a new product the compound of the formula:

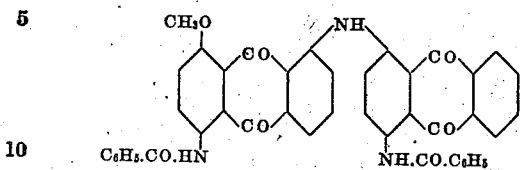

which dissolves in concentrated sulfuric acid with olive-green color changing soon to a copper-red and forming well-crystallized dark-brown needles of metallic lustre.

4. Materials dyed with the compounds of claim 1.

5. Materials dyed with the compound of claim 3.

6. Materials dyed with the compounds of claim 2.

In testimony whereof I have hereunto set my hand.

FRITZ BAUMANN.